(12) United States Patent
Arakawa

(10) Patent No.: US 9,002,709 B2
(45) Date of Patent: Apr. 7, 2015

(54) VOICE RECOGNITION SYSTEM AND VOICE RECOGNITION METHOD

(75) Inventor: Takayuki Arakawa, Tokyo (JP)

(73) Assignee: NEC Corporation, Tokyo (JP)

( * ) Notice: Subject to any disclaimer, the term of this patent is extended or adjusted under 35 U.S.C. 154(b) by 491 days.

(21) Appl. No.: 13/514,894

(22) PCT Filed: Nov. 26, 2010

(86) PCT No.: PCT/JP2010/071619
§ 371 (c)(1),
(2), (4) Date: Jun. 8, 2012

(87) PCT Pub. No.: WO2011/070972
PCT Pub. Date: Jun. 16, 2011

(65) Prior Publication Data
US 2012/0239401 A1    Sep. 20, 2012

(30) Foreign Application Priority Data
Dec. 10, 2009    (JP) .................................. 2009-280927

(51) Int. Cl.
G10L 17/00    (2013.01)
G10L 25/87    (2013.01)
G10L 15/04    (2013.01)

(52) U.S. Cl.
CPC ................. *G10L 25/87* (2013.01); *G10L 15/04* (2013.01)

(58) Field of Classification Search
CPC ...................................................... G10L 15/05
USPC ........................................ 704/253, 233, 250
See application file for complete search history.

(56) References Cited

U.S. PATENT DOCUMENTS 4,700,392 A * 10/1987 Kato et al. ..................... 704/233
5,305,422 A *  4/1994 Junqua .......................... 704/253

(Continued)

FOREIGN PATENT DOCUMENTS

JP    5-6193 A    1/1993
JP    6-43895 A   2/1994

(Continued)

OTHER PUBLICATIONS

Burileanu, Dragos, et al. "An adaptive and fast speech detection algorithm." Text, Speech and Dialogue. Springer Berlin Heidelberg, 2000.*

(Continued)

*Primary Examiner* — Vincent P Harper
(74) *Attorney, Agent, or Firm* — Sughrue Mion, PLLC

(57) ABSTRACT

Provided is a voice recognition system capable of, while suppressing negative influences from sound not to be recognized, correctly estimating utterance sections that are to be recognized. A voice segmenting means calculates voice feature values, and segments voice sections or non-voice sections by comparing the voice feature values with a threshold value. Then, the voice segmenting means determines, to be first voice sections, those segmented sections or sections obtained by adding a margin to the front and rear of each of those segmented sections. On the basis of voice and non-voice likelihoods, a search means determines, to be second voice sections, sections to which voice recognition is to be applied. A parameter updating means updates the threshold value and the margin. The voice segmenting means determines the first voice sections by using the one of the threshold value and the margin which has been updated by the parameter updating means.

9 Claims, 11 Drawing Sheets

(56) References Cited

U.S. PATENT DOCUMENTS

| | | | |
|---|---|---|---|
| 5,884,257 A * | 3/1999 | Maekawa et al. | 704/248 |
| 6,044,342 A * | 3/2000 | Sato et al. | 704/233 |
| 6,718,302 B1 * | 4/2004 | Wu et al. | 704/233 |

FOREIGN PATENT DOCUMENTS

| | | |
|---|---|---|
| JP | 10-254475 A | 9/1998 |
| JP | 2001-013988 A | 1/2001 |
| JP | 2002-091468 A | 3/2002 |
| JP | 2002-156992 A | 5/2002 |
| JP | 2005-181458 A | 7/2005 |
| JP | 2007-017736 A | 1/2007 |
| JP | 2009-175179 A | 8/2009 |
| WO | 2009/069662 A1 | 6/2009 |

OTHER PUBLICATIONS

Akio Ando, "Real Time Voice Recognition", Institute of Electronics, Information and Communication Engineers, Sep. 2003, pp. 28-33, 59-61 and 148-165, Japan.

* cited by examiner

VOICE RECOGNITION SYSTEM AND VOICE RECOGNITION METHOD

CROSS REFERENCE TO RELATED APPLICATION

This application is a National Stage of International Application No. PCT/JP2010/071619 filed Nov. 26, 2010, claiming priority based on Japanese Patent Application No. 2009-280927 filed Dec. 10, 2009, the contents of all of which are incorporated herein by reference in their entirety.

TECHNICAL FIELD

The present invention relates to a voice recognition system, a voice recognition method and a voice recognition program which recognize voices in an environment where background noise exists.

BACKGROUND ART

A general voice recognition system extracts a time series of a feature value from time-series data of an input sound garnered by a microphone, and calculates likelihood about the time series of the feature value using a word and phoneme model to be a recognition object, and a model of non-voice other than the recognition object. Then, the voice recognition system searches for a word sequence corresponding to the time series of the input sound based on the likelihood which has been calculated, and outputs a recognition result. A plurality of proposals has been made about a method to improve accuracy of voice recognition.

In patent document 1, there is described a voice recognition apparatus which reduces deterioration of voice recognition performance caused by a silent part. FIG. 9 is an explanatory drawing showing the voice recognition apparatus disclosed in patent document 1. The voice recognition apparatus disclosed in patent document 1 includes a microphone 201 which catches an input sound, a framing unit 202 that clips time-series data of the garnered sound in predetermined time units, a noise observation section extraction unit 203 which extracts a noise section, an utterance switch 204 for a user to notify the system of starting of utterance, a feature value extracting unit 205 which extracts the feature value for each piece of voice data that has been clipped, a voice recognition unit 208 which performs voice recognition about the time series of the feature value and a silent model correction unit 207 which corrects the silent model among acoustic models used by the voice recognition unit.

In the voice recognition apparatus disclosed in patent document 1, the noise observation section extraction unit 203 estimates background noise from the section just before the utterance switch 204 is pushed, and the silent model correction unit 207 makes the silent model adapt itself to a background noise environment based on the background noise which has been estimated. By making it easy to discriminate a sound except for voices to be an object as being silent by such structure, the voice recognition apparatus mitigates false recognition of voice.

In patent document 2, there is described a voice recognition apparatus which reduces a false-recognition rate about a voice section to which background noise other than data having been used at the time of garbage model learning has been added. FIG. 10 is an explanatory drawing showing the voice recognition apparatus disclosed in patent document 2. The voice recognition apparatus described in patent document 2 includes analysis means 302 for analyzing a time series of a feature value from time-series data of a garnered sound, offset calculating means 303 for calculating a correction amount based on the feature value, a collating means 304 for performing collation of a recognition object word sequence from the time series of the feature value, garbage model 305 made by modeling a sound pattern corresponding to background noise and a recognition object vocabulary model 306.

In the voice recognition apparatus disclosed in patent document 2, the offset calculating means 303 judges a pitch frequency from the feature value, and possibility of being voice from a formant frequency and a feature value of a bandwidth and the like. Then, the offset calculating means 303 obtains an offset for correcting likelihood about the garbage model based on the judgment result. The collating means 304 performs pattern matching using the likelihood about the garbage model corrected using the above-mentioned offset, the feature value, the garbage model and the recognition object vocabulary model. By such structure, the voice recognition apparatus can recognize just the voice to be the recognition object correctly.

Further, in non-patent document 1, there is described a method to recognize a voice from voice data and a model used for voice recognition.

PATENT DOCUMENT

[Patent document 1] Japanese Patent Application Laid-Open No. 2002-156992
[Patent document 2] Japanese Patent Application Laid-Open No. 2007-17736

NON-PATENT DOCUMENT

[Non-patent document 1] Akio Ando, "Real Time Voice recognition", Institute of Electronics, Information and Communication Engineers, September, 2003, pp. 28-33, pp. 59-61, pp. 148-165

SUMMARY OF THE INVENTION

Problem to be Solved by the Invention

When voice recognition is performed, there is a case where the background noise, line noise and sudden noise such as a sound of hitting a microphone and the like exists. In such case, by using the voice recognition apparatus disclosed in patent document 1 and patent document 2, an error of voice recognition can be suppressed.

That is, the voice recognition apparatus disclosed in patent document 1 estimates a noise from the section just before the utterance switch is pressed. By doing so, the voice recognition apparatus makes the silent model adapt itself to the background noise environment in order to suppress negative influence of sounds other than the recognition object. However, there are cases in which a speaker who is unfamiliar with voice recognition begins to speak before the utterance switch is pressed and the speaker begins to speak at a later time after the utterance switch has been pressed. In these cases, a time during which the utterance switch is being pressed and a time during which vocalization of the recognition object is being made do not correspond to each other necessarily. Therefore, in such cases, there is a problem that the voice recognition apparatus cannot estimate an utterance section to be a target correctly.

In order to suppress negative influence of sounds other than the recognition object, the voice recognition apparatus disclosed in patent document 2 judges possibility of being voice and obtains the offset for correcting the likelihood about the garbage model. For example, the voice recognition apparatus determines possibility of being voice from such as feature values of the pitch frequency, the formant frequency and the bandwidth. However, under a high noise environment, determination of possibility of being voice is not correct necessarily. For this reason, there is a case where the calculated offset has negative influence on determining possibility of being voice.

Hereinafter, problems which occur under the high noise environment will be described. For example, under a low noise environment, a voice section (a section during which a person is vocalizing) and a non-voice section are easily determined using a difference in power (volume). That is, volume is small for a section during which a person is not vocalizing, and volume is large for a section during which the person is vocalizing. For this reason, by determining whether volume is equal to or larger than a threshold value, the voice recognition apparatus can discriminate a voice and a non-voice. However, under the high noise environment, even if the person is not uttering, a volume of the noise is large. Because the threshold value which is set in order to discriminate whether it is the voice or the non-voice depends on the volume of the noise, determination of the voice and the non-voice becomes difficult.

A reason why determination of the voice and the non-voice becomes difficult will be described using a specific example. In general, a volume of the voice tends to become large in a section during which speaking is being performed relatively loudly and clearly, and become small in sections at the beginning and the end of utterance. Hereinafter, it is supposed that the volume of the voice is S, and the maximum value of the volume of the voice is described as Smax and the minimum value is described as Smin. The volume of the noise varies, too, although it not as much as that of the voice. Hereinafter, it is supposed that the volume of the noise is N, and the maximum value of the volume of the noise is described as Nmax and the minimum value thereof as Nmin.

Here, given that the threshold value when discriminating the voice and the non-voice is described as θ, the voice recognition apparatus can discriminate whether it is the voice or the non-voice if threshold value θ is included in the range of Nmax<θ<Smin+Nmin. That is, it is because, when the threshold value θ is included in the range of Nmax<θ<Smin+Nmin, relation of S>θ holds in the voice section and relation of N<θ holds in the non-voice section always. From this relation, the following two points can be cited as a condition required for the threshold value θ.

(1) Because the minimum value Smin of the volume of the voice is not known until the end of utterance, the maximum value that the threshold value θ can take is unknown. For this reason, a user or the like wants to set θ as small as possible.

(2) The maximum value Nmax of the volume of noise is not known until the end of utterance (however, it is possible for the voice recognition apparatus to estimate a rough volume of the noise prior to the start of utterance). For this reason, the user or the like wants to set θ larger than an estimated volume of the noise as much as possible.

When an estimated numerical value of the noise is small, it is relatively easy for the user and the like to set the threshold value θ which satisfies the above two conditions. However, when the estimated numerical value of the noise is large, it is difficult for the user and the like to set appropriate the threshold value θ.

Also, there is a problem that, because a determination criterion of possibility of being a voice is fixed in the voice recognition apparatus disclosed in patent document 2, it cannot handle a varying noise.

As above, when negative influence of sounds other than the recognition object is tried to be suppressed, there is a problem that, if the voice recognition apparatus cannot estimate a target utterance section correctly, the voice recognition apparatus cannot perform effectively the voice recognition.

Accordingly, in order to solve the above-mentioned problems, an object of the present invention is to provide a voice recognition system, a voice recognition method and a voice recognition program which can suppress negative influence of sounds other than the recognition object and estimate the utterance section to be the target correctly.

Means for Solving a Problem

A voice recognition system according to the present invention includes voice segmentation unit which calculates a voice feature value based on time-series input sound data, segmenting one of a section of voice of said time-series input sound data and a section of non-voice of said time-series input sound data by comparing a threshold value and said voice feature value, and determining one of said section and a section made by adding a margin of designated length before and after said original section as a first voice section; search unit which determines a section to be a target of a voice recognition as a second voice section based on a likelihood of voice and a likelihood of non-voice calculated based on a voice recognition feature value; parameter updating unit which updates at least one of said threshold value and said margin used upon said voice segmentation unit determining the first voice section according to a difference between length of said first voice section and length of said corresponding second voice section; and said voice segmentation unit which determines the first voice section using one of the threshold value and the margin updated by said parameter updating unit.

A voice recognition method according to the present invention calculates a voice feature value based on time-series input sound data; segments one of a section of voice of said time-series input sound data and a section of non-voice of said time-series input sound data by comparing a threshold value and said voice feature value; determines one of said section and a section made by adding a margin of designated length before and after said original section as a first voice section; determines a section to be a target of a voice recognition as a second voice section based on a likelihood of voice and a likelihood of non-voice calculated based on a voice recognition feature value; updates at least one of said threshold value and said margin used upon determining said first voice section according to a difference between length of said first voice section and length of said corresponding second voice section; and, upon segmenting said first voice section, determines the first voice section using one of the updated threshold value and margin.

A voice recognition program stored in a non-transitory computer-readable recording medium according to the present invention causes a computer to execute voice segmenting processing for calculating a voice feature value based on time-series input sound data, segmenting one of a section of voice of said time-series input sound data and a section of non-voice of said time-series input sound data by comparing a threshold value and said voice feature value, and determining one of said section and a section made by adding a margin of designated length before and after said section as a first voice section; search processing for determining a section to be a target of a voice recognition as a second voice section based on a likelihood of voice and a likelihood of non-voice calculated based on a voice recognition feature value; parameter updating processing for updating at least one of said threshold value and said margin used upon determining said first voice section according to a difference between length of said first voice section and length of said corresponding second voice section; and, in said voice segmenting processing, making the first voice section be determined using one of the threshold value and the margin updated in said parameter updating processing.

Effect of the Invention

The present invention provides the voice recognition system, the voice recognition method and the voice recognition program capable of suppressing bad influence of sounds other than the recognition object and estimating an utterance section to be a target correctly.

EXEMPLARY EMBODIMENTS FOR CARRYING OUT OF THE INVENTION

Hereinafter, exemplary embodiments of the present invention will be described with reference to a drawing.

Exemplary Embodiment 1

Figure 1:
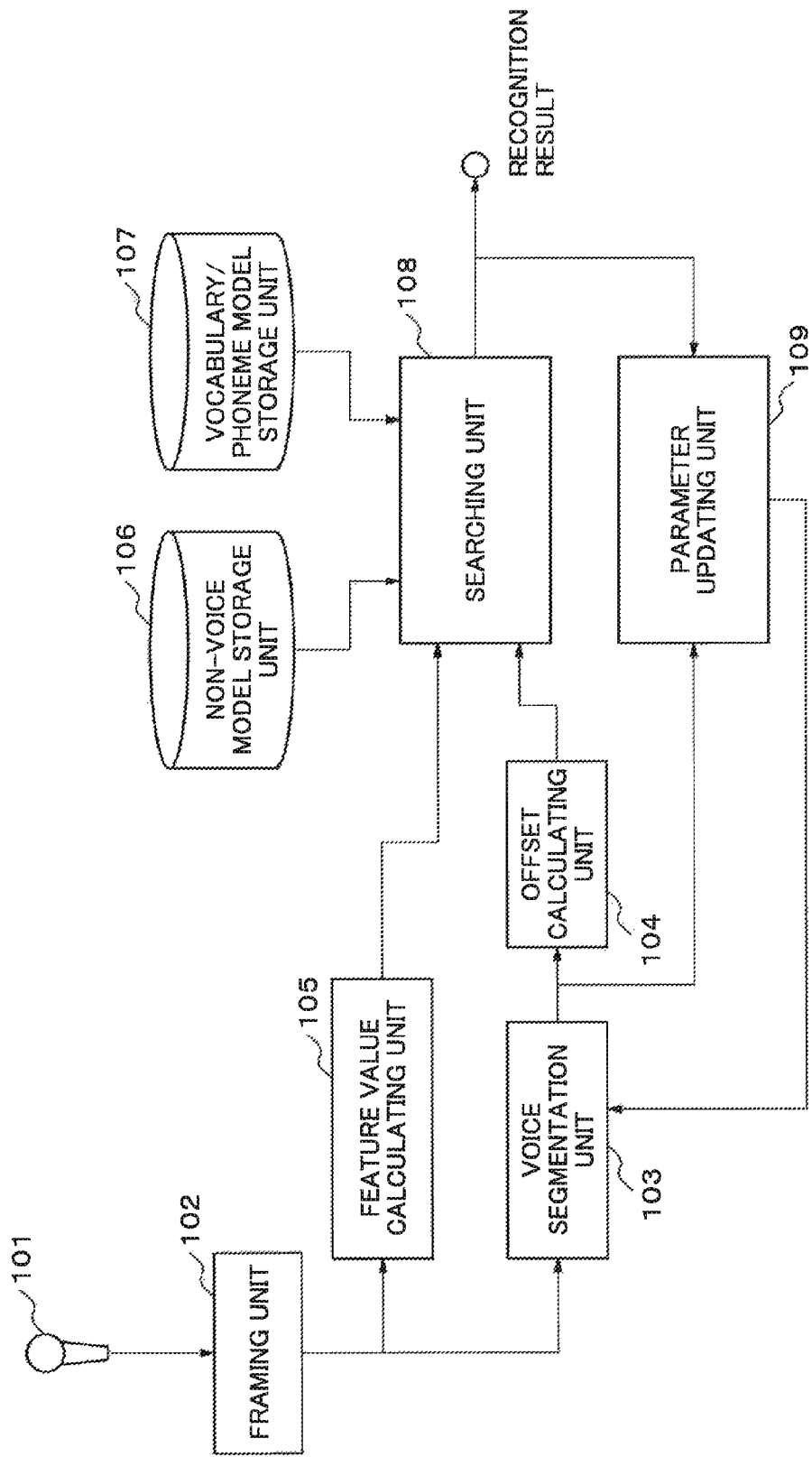
FIG. 1 is a block diagram showing an example of a voice recognition system in a first exemplary embodiment of the present invention.

FIG. 1 is a block diagram showing an example of a voice recognition system in the first exemplary embodiment of the present invention. The voice recognition system includes a microphone 101, a framing unit 102, a voice segmentation unit 103, an offset calculating unit 104 and a feature value calculating unit 105. Further, the voice recognition system includes a non-voice model storage unit 106, a vocabulary/phoneme model storage unit 107, a searching unit 108 and a parameter updating unit 109.

The microphone 101 is a device which catches an input sound.

The framing unit 102 performs clipping to time-series input sound data garnered by the microphone 101 for each unit time. Meanwhile, data which is made by performing clipping to the input sound data for each unit time is described as a frame. That is, the framing unit 102 performs clipping to input sound data for each frame.

The voice segmentation unit 103 calculates a voice segmentation feature value which indicates possibility of being voice for each frame input sound data. Then, the voice segmentation unit 103 classifies each frame into a voice frame or a non-voice frame by comparing a threshold value (hereinafter, it is referred to as threshold θ) and a voice segmentation feature value for each frame. If a calculated voice feature value for a frame is larger than the threshold value θ, the frame is classified as a voice frame. If a calculated voice feature value is less than the threshold value θ, the frame is classified as a non-voice frame. Then, the voice segmentation unit 103 merges connected voice frames classified above into a voice section (hereinafter, referred to as a first voice section). As a voice segmentation feature value, amplitude power for each frame can be used, for example. However, the voice segmentation feature value which indicates possibility of being voice is not limited to amplitude power.

The voice recognition feature value calculating unit 105 calculates a feature value used for voice recognition (hereinafter, it is described as a voice recognition feature value) for each frame input sound data. As a voice recognition feature value, cepstrum feature or its derivative feature can be used, for example. However, the voice recognition feature value is not limited to cepstrum feature and its derivative feature. Because a calculation method of feature values used for voice recognition is known widely, detailed description will be omitted.

Meanwhile, the voice segmentation feature value and the voice recognition feature value may be different feature values or may be the identical feature value.

The non-voice model storage unit 106 stores a non-voice model which expresses a pattern except for voice to be a target of the voice recognition. In the following description, the pattern except for voice to be the target of the voice recognition may be described as a non-voice pattern. The vocabulary/phoneme model storage unit 107 stores the vocabulary/phoneme model representing a pattern of vocabulary or a phoneme of the voice to be the target of the voice recognition. For example, the non-voice model storage unit 106 and the vocabulary/phoneme model storage unit 107 store non-voice models and vocabulary/phoneme models expressed in a probability model such as a hidden Markov model. Meanwhile, the voice recognition system may be made to learn parameters of a model using average input sound data in advance. The non-voice model storage unit 106 and the vocabulary/phoneme model storage unit 107 are realized by magnetic disk devices or the like, for example.

The searching unit 108 calculates, based on the voice recognition feature value, a likelihood of voice and a likelihood of non-voice for each frame, and searches for a word sequence using these likelihoods and the above-mentioned models. The searching unit 108 may search for a maximum-likelihood word sequence among calculated the likelihoods of voice, for example.

Also, the searching unit 108 segments a section to be the target of the voice recognition (hereinafter, it is referred to as a second voice section) based on the likelihood of voice and the likelihood of non-voice that have been calculated. Specifically, the searching unit 108 segments a section during which the likelihood of voice that has been calculated based on the voice recognition feature value is higher than the likelihood of non-voice that has been calculated based on a voice recognition feature value as the second voice section.

Thus, the searching unit 108 obtains the word sequence corresponding to the input sound (a recognition result) using the feature value for each frame, the vocabulary/phoneme model and the non-voice model, and, in addition to that, obtains the second voice section. Meanwhile, the likelihood of voice is a numerical value representing likelihood that the pattern of vocabulary or the phoneme of voice expressed in the vocabulary/phoneme model and an input sound correspond with each other. Similarly, the likelihood of non-voice is a numerical value representing likelihood that the non-voice pattern expressed in the non-voice model and the input sound correspond with each other.

According to a difference between length of the first voice section and length of the second voice section, the parameter updating unit 109 updates the threshold value θ. That is, the parameter updating unit 109 compares the first voice section and the second voice section, and updates the threshold value θ to be used by the voice segmentation unit 103.

According to a difference between the feature value which indicates possibility of being voice (the voice feature value) and the threshold value θ, the offset calculating unit 104 calculates an offset which is used as a numerical value for correcting the likelihood of voice or the likelihood of non-voice. That is, the offset calculating unit 104 calculates the offset for the likelihood from the feature value which indicates possibility of being voice (the voice feature value) and the threshold value θ. After the offset has been calculated, the searching unit 108 segments the second voice section based on the likelihood corrected according to this offset.

The framing unit 102, the voice segmentation unit 103, the offset calculating unit 104, the feature value calculating unit 105, the searching unit 108 and the parameter updating unit 109 are realized by a CPU (Central Processing Unit) of a computer which operates according to a program (a voice recognition program). For example, the program is stored in a memory unit (not shown) of a voice recognition apparatus (a voice recognition system). The CPU reads the program. Then, the CPU may operate as the framing unit 102, the voice segmentation unit 103, the offset calculating unit 104, the feature value calculating unit 105, the searching unit 108 and the parameter updating unit 109 according to the read program. Also, each of the framing unit 102, the voice segmentation unit 103, the offset calculating unit 104, the feature value calculating unit 105, the searching unit 108 and the parameter updating unit 109 may be realized by dedicated hardware.

Figure 11:
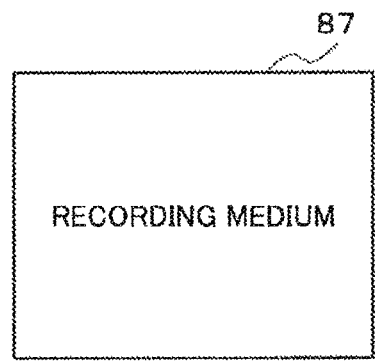
FIG. 11 is an explanatory drawing showing a non-transitory computer-readable recording medium.

FIG. 11 is an explanatory drawing showing the non-transitory computer-readable recording medium 87. A non-transitory computer-readable recording medium 87 recording thereon the programs may be supplied to the computer.

Figure 2:
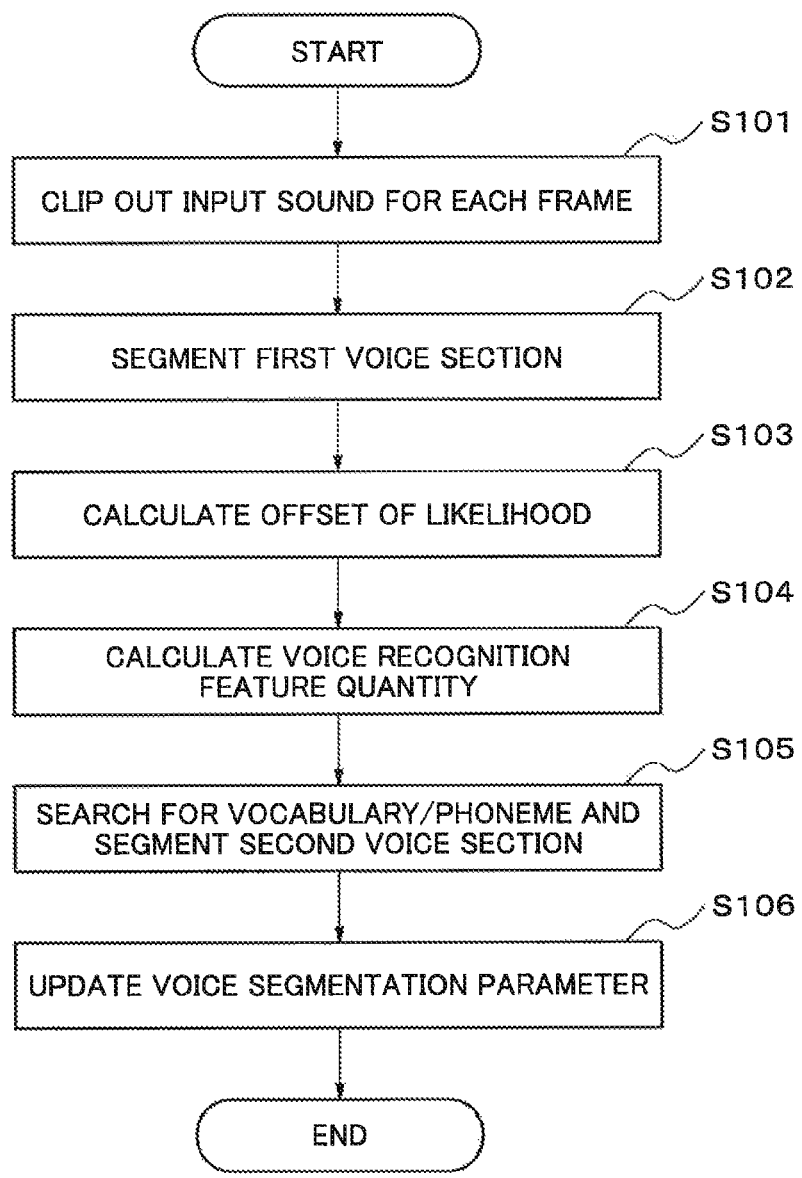
FIG. 2 is a flow chart showing an example of operations of a voice recognition system in the first exemplary embodiment.

Next, operations of this exemplary embodiment will be described using FIG. 1 and FIG. 2. FIG. 2 is a flow chart showing an example of operations of the voice recognition system in this exemplary embodiment.

First, when the microphone 101 catches the input sound, the framing unit 102 performs clipping to the garnered time-series input sound data into a frame for each unit time (Step S101). For example, the framing unit 102 may clip out waveform data for a unit time successively while shifting in turn a portion to be a target of clipping from input sound data by a time set in advance. Hereinafter, such unit time is described as a frame width, and such time set in advance is called a frame shift. For example, when input sound data is of 16 bit Linear-PCM (Pulse Code Modulation) of the sampling frequency 8000 Hz, waveform data of 8000 points a second is included. In this case, the framing unit 102 clips out this waveform data sequentially according to a time series with 200 points of a frame width (that is, 25 ms) and 80 points of a frame shift (that is, 10 ms).

Next, the voice segmentation unit 103 determines the first voice section by calculating the feature value which indicates possibility of being voice of input sound data clipped for each frame (that is, the voice feature value), and comparing it with the threshold value θ (Step S102). Meanwhile, regarding a numerical value of the threshold value θ at the initial state, the user and the like may perform setting of the value by designating the numerical value of the threshold value θ in advance. Or more specifically, regarding a numerical value of threshold value θ at the initial state, the voice segmentation unit 103 may set, based on the numerical value of noise estimated in the non-voice section before utterance starts, the numerical value larger than the estimated value, for example. The feature value which indicates possibility of being voice can be expressed in amplitude power, for example. The voice segmentation unit 103 calculates t-th frame amplitude power Xt by the following Formula 1, for example.

$$x_t = \frac{1}{N}\sum_{i=0}^{N-1} s_{t+i}^2 \qquad \text{(Formula 1)}$$

Here, N is the number of the clipped frame width (200 points). St+i is a numerical value of input sound data (waveform data) at i-th point in t-th frame. Formula 1 shows t-th frame amplitude power Xt is calculated by averaging N square values for each numerical value of input sound data in t-th frame.

Figure 3:
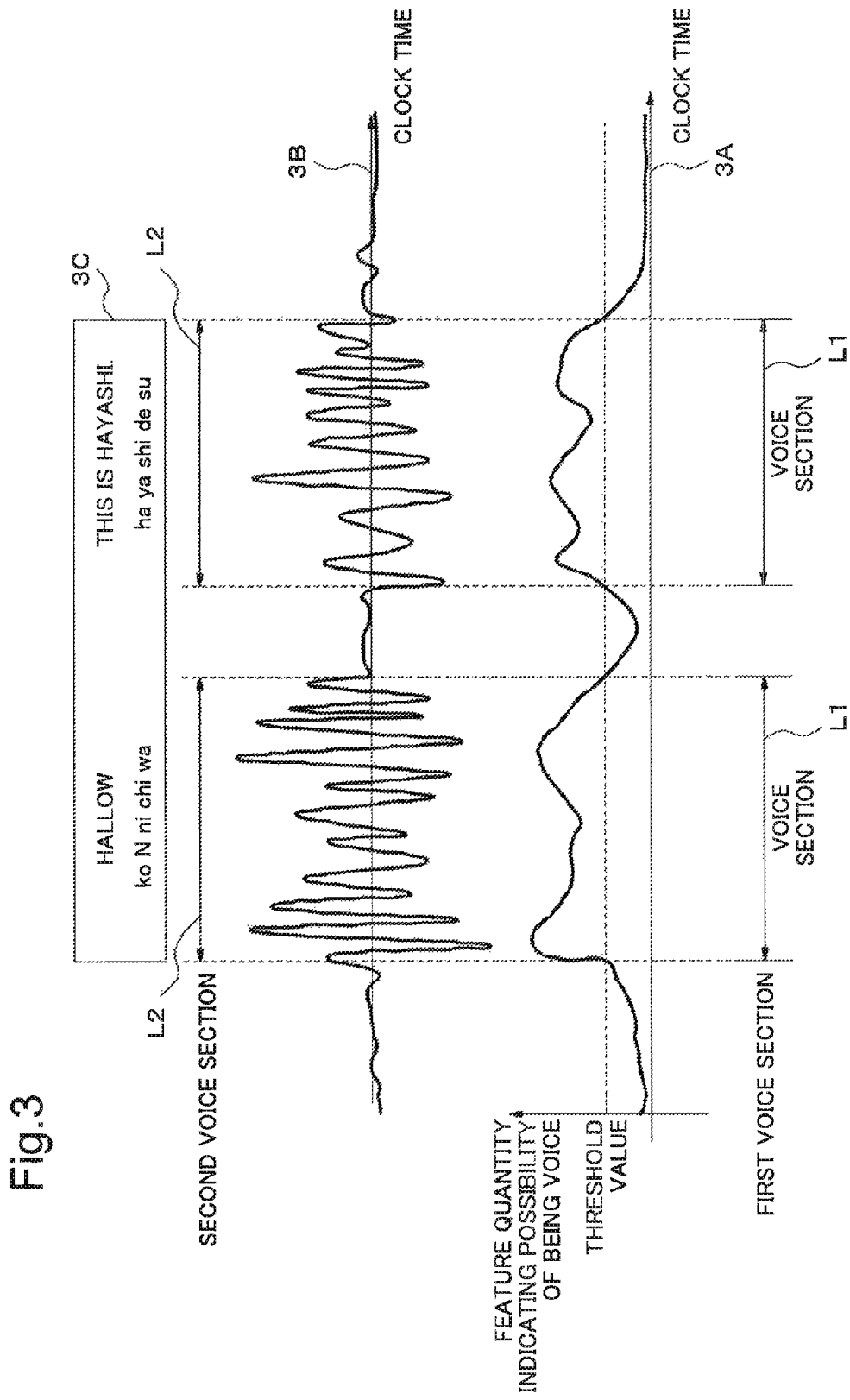
FIG. 3 is an explanatory drawing showing an example of a time series of input sound data and a time series of a feature value which indicates possibility of being voice.

FIG. 3 is an explanatory drawing showing an example of a time series of input sound data and a time series of the feature value which indicates possibility of being voice and the feature value used for voice recognition. FIG. 3 indicates time series 3A of the feature value which represents possibility of being voice and time series 3B of the feature value used for voice recognition when voice 3C which says "Hello, This is Hayashi" has been inputted.

As time series 3A in FIG. 3 indicates, because it can be said that it is more likely to be a voice when amplitude power is larger than the threshold value θ, the voice segmentation unit 103 segments that section as the voice section (L1 in FIG. 3). On the other hand, because it can be said that it is more likely to be a non-voice when amplitude power is smaller than the threshold value θ, the voice segmentation unit 103 segments that section as the non-voice section. Meanwhile, here, a case where amplitude power is employed as the feature value which indicates possibility of being voice has been described. Alternatively, the voice segmentation unit 103 may discriminate the voice section using, as the feature value which indicates possibility of being voice, a signal-to-noise ratio (SN ratio), the number of zero crossings, a likelihood ratio between the voice model and the non-voice model, a likelihood ratio based on Gaussian mixture distribution model (GMM likelihood ratio) or a pitch frequency. Or, the voice segmentation unit 103 may calculate a combination or the like of them to discriminate a voice section using a feature value of it.

Next, the offset calculating unit 104 calculates an offset of likelihood from the feature value which indicates possibility of being voice and the threshold value θ (Step S103). Meanwhile, such offset of likelihood is used as an offset of a likelihood of feature values for a vocabulary/phoneme model and a non-voice model, the feature values being calculated when the searching unit 108 mentioned later searches for the word sequence.

For example, the offset calculating unit 104 calculates an offset of likelihood for the vocabulary/phoneme model by the following Formula 2.

Offset (of likelihood for the vocabulary/phoneme model)=w×(Xt−θ)  (Formula 2)

Here, w is a factor for an offset, and it takes a positive actual number. Specifically, w is a parameter which adjusts an amount by which a logarithm likelihood mentioned later is changed by one time of correction. When w is large, a voice recognition apparatus converge with an appropriate offset quickly. On the other hand, when w is small, the voice recognition apparatus controls excessive change of the threshold value θ, and can change an offset stably. For example, a system administrator may set an appropriate value of w in advance considering a balance of these.

Also, the offset calculating unit 104 calculates an offset of likelihood for a non-voice model by the following Formula 3, for example.

Offset (of likelihood for a non-voice model)=w×(θ−Xt)  (Formula 3)

Here, an example in which an offset is calculated by a linear function of a feature value Xt which indicates possibility of being voice has been described. However, a method by which the offset calculating unit 104 calculates an offset is not limited to a case where a linear function of the feature value Xt which indicates possibility of being voice is used. When the relationship to calculate the feature value Xt small compared with the threshold value θ by calculating an offset greatly when the feature value Xt is large compared with the threshold value θ is kept, the offset calculating unit 104 may calculate an offset using another function.

Here, description has been made about a case where the offset calculating unit 104 calculates both of the offset of the likelihood for the vocabulary/phoneme model and the offset of the likelihood for the non-voice model. However, the offset calculating unit 104 does not have to calculate both of the offset of the likelihood for the vocabulary/phoneme model and the offset of the likelihood for a non-voice model. For example, the offset calculating unit 104 may calculate only either one of the offsets, and make the other offset be 0.

Next, the feature value calculating unit 105 calculates the feature value which is used for voice recognition (the voice recognition feature value) from input sound data clipped out for each frame (Step S104).

Using the feature value for each frame (the voice recognition feature value), the vocabulary/phoneme model and a non-voice model, the searching unit 108 searches for the word sequence corresponding to the time series of the input sound data and segments the second voice section (Step S105). For example, the searching unit 108 searches for the word sequence using a hidden Markov model as the vocabulary/phoneme model and a non-voice model.

Meanwhile, parameters of each model may be parameters made by making the voice recognition apparatus perform learning using typical input sound data in advance.

Next, a method by which the searching unit 108 segments the second voice section will be described specifically. First, the searching unit 108 calculates the likelihood of voice and the likelihood of non-voice. In general voice recognition, the logarithm likelihood is employed as a distance scale between a feature value and each model. Therefore, here, a case where the logarithm likelihood is used will be described. The searching unit 108 may calculate the logarithm likelihood of voice and non-voice based on the following Formula 4, for example.

$$\log L(y,\theta) = -\frac{n}{2}\log(2\pi\sigma^2) - \frac{1}{2\sigma^2}\sum_{i=0}^{n-1}(y(i)-\mu)^2 \quad \text{(Formula 4)}$$

Here, log L (y; θ) is the logarithm likelihood of voice (non-voice) when pattern row y of voice (non-voice) is given, and y (i) is the feature value used for voice recognition (the voice recognition feature value). In addition, μ and σ (they are collectively expressed as θ) are parameters set for each model. Meanwhile, here, a numerical value of n may be n=1. As above, the searching unit 108 calculates the likelihood of voice and the likelihood of non-voice based on the voice recognition feature value. Meanwhile, in the above-mentioned description, a case where the searching unit 108 calculates the logarithm likelihood as likelihood has been described. However, a content calculated as likelihood is not limited to the logarithm likelihood.

Here, the logarithm likelihood between the time series of the feature value for each frame and a model which expresses each vocabulary/phoneme included in the above-mentioned vocabulary/phoneme model is represented as Ls (j, t). J shows one state of each vocabulary/phoneme model. By Formula 5 illustrated below, the searching unit 108 corrects the logarithm likelihood Ls (j, t) using an offset which the offset calculating unit 104 has calculated.

Ls(j,t)←Ls(j,t)+w×(Xt−θ)  (Formula 5)

Also, the logarithm likelihood between the time series of the feature value for each frame and a model which expresses each piece of non-voice included in the above-mentioned non-voice model is represented as Ln (j, t). J shows one state of the non-voice model. At that time, by Formula 6 illustrated below, the searching unit 108 corrects the logarithm likelihood Ln (j, t) using the offset which the offset calculating unit 104 has calculated.

Ln(j,t)←Ln-(j,t)+w×(θ−Xt)  (Formula 6)

By searching for the pattern of vocabulary or a phoneme of voice with which the logarithm likelihood becomes biggest among time series of the corrected logarithm likelihoods, the searching unit 108 searches for the word sequence corresponding to the time series of the input sound data such as voice 3C illustrated in FIG. 3. Alternatively, by searching for a pattern of non-voice with which the logarithm likelihood becomes biggest among time series of the corrected logarithm likelihoods, the searching unit 108 searches for the word sequence corresponding to the time series of the input sound data like voice 3C illustrated in FIG. 3. For example, when the above-mentioned Formula 4 is used, the searching unit 108 obtains a numerical value of θ which maximizes a numerical value of log L (y; θ). At that time, the searching unit 108 segments a section during which the corrected logarithm likelihood of the vocabulary/phoneme model is larger than the corrected logarithm likelihood of a non-voice model as the second voice section. The example shown in FIG. 3 indicates that the searching unit 108 has segmented a portion where the dashed line segments as the second voice section L2.

As above, the searching unit 108 calculates the logarithm likelihood Ls and Ln, and corrects the calculated logarithm likelihood Ls and Ln using an offset of likelihood. Then, the searching unit 108 segments a section during which the corrected Ls and Ln meet Ls (j, t)>Ln (j, t) as the second voice section.

Meanwhile, in the above description, a case where the searching unit 108 calculates the logarithm likelihood using Formula 4 to discriminate the second voice section has been described. However, the searching unit 108 may discriminate the second voice section using a method such as A* search and beam search. That is, a score calculated by an A* search and a beam search when using a model expressing vocabulary and a phoneme and a model expressing non-voice is likelihood about a voice and a non-voice. Therefore, the searching unit 108 may discriminate a section during which a calculated score of voice is higher than a score of non-voice as the second voice section.

Next, the parameter updating unit 109 compares the first voice section which the voice segmentation unit 103 has segmented and the second voice section which the searching unit 108 has segmented, and updates a numerical value of the threshold value θ which is a parameter used by the voice segmentation unit 103 (Step S106). Specifically, according to the length of the first voice section and the length of the second voice section, the parameter updating unit 109 updates a numerical value of the threshold value θ for determining the first voice section.

Figure 4:
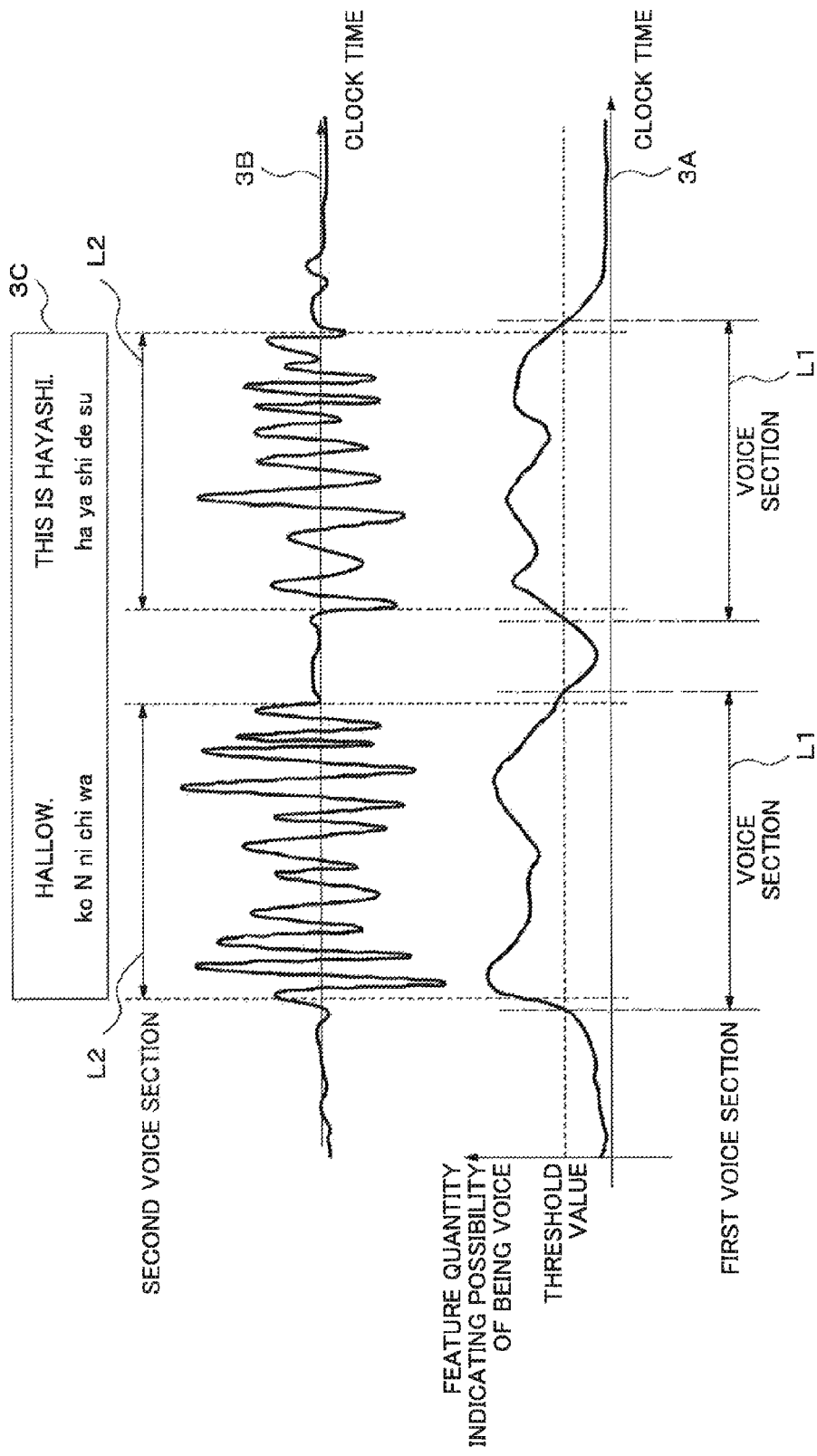
FIG. 4 is an explanatory drawing showing an example when a first voice section is longer than a second voice section.
Figure 5:
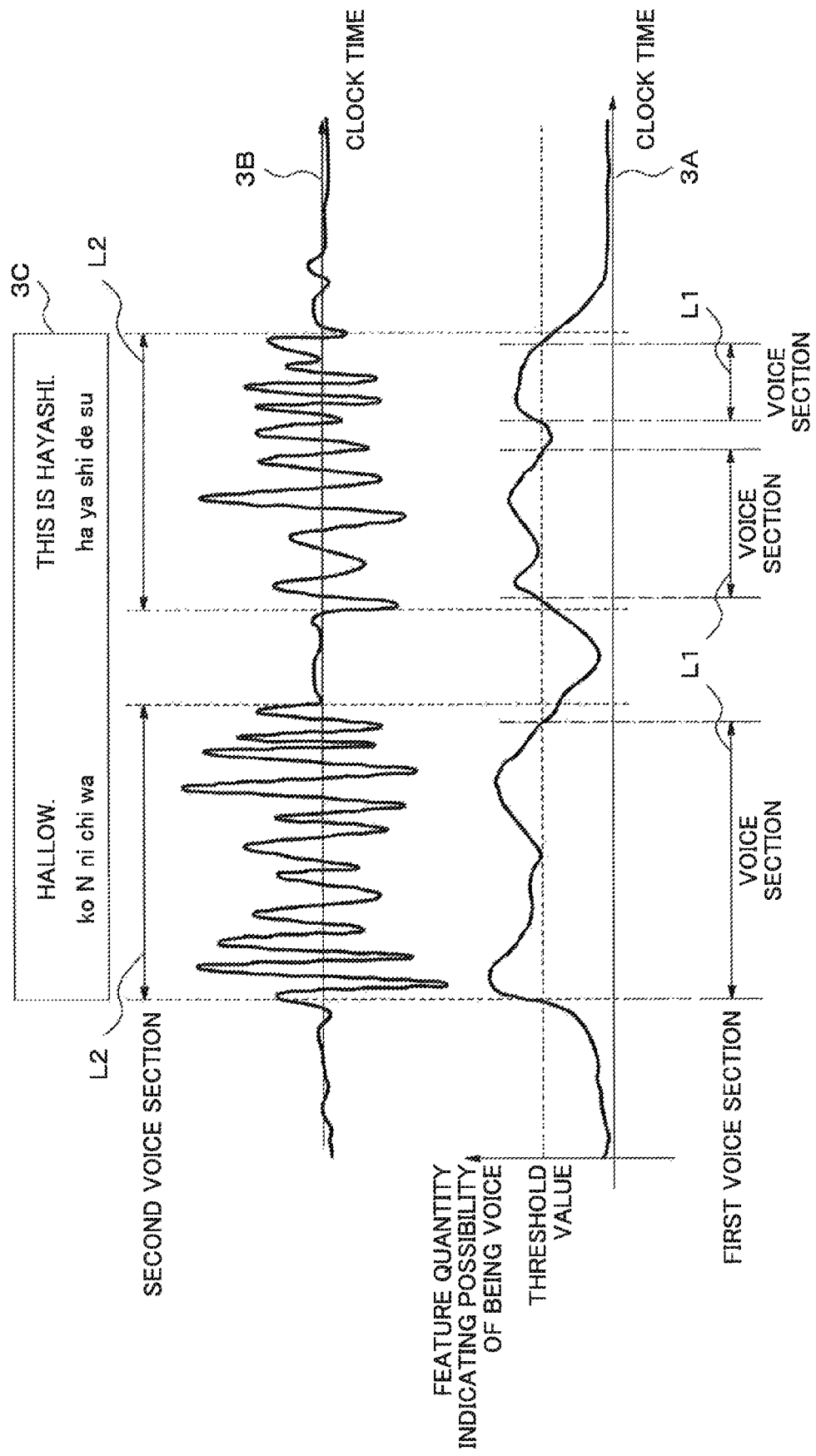
FIG. 5 is an explanatory drawing showing an example when the first voice section is shorter than the second voice section.

Hereinafter, operations in which the parameter updating unit 109 updates a numerical value of the threshold value θ will be described using FIG. 4 and FIG. 5. FIG. 4 is an explanatory drawing showing an example when the first voice section is longer than the second voice section. FIG. 5 is an explanatory drawing showing an example when the first voice section is shorter than the second voice section. As illustrated in FIG. 4, when length L1 of the first voice section is longer than length L2 of the second voice section, the parameter updating unit 109 updates the threshold value θ such that it becomes larger. On the contrary, when the length L1 of the first voice section is shorter than the length L2 of the second voice section as illustrated in FIG. 5, the parameter updating unit 109 updates the threshold value θ such that it becomes smaller. Specifically, the parameter updating unit 109 updates the threshold value θ using Formula 7 illustrated below.

$$\theta \leftarrow \theta + \epsilon(L2-L1) \quad \text{(Formula 7)}$$

Here, $\epsilon$ is a positive numerical value which indicates a step size and is a parameter for adjusting an amount by which the threshold value θ is changed by one time of update.

In the above description, a case where the parameter updating unit 109 updates the threshold value θ based on the lengths of voice sections has been described. Alternatively, the parameter updating unit 109 may update the threshold value θ based on length of the non-voice section. In this case, the voice segmentation unit 103 segments a section during which the voice feature value is smaller than the threshold value θ as the first voice section. The searching unit 108 segments a section where the corrected likelihood Ln about non-voice is higher than the corrected likelihood Ls about voice as the second voice section.

Also, in the above-mentioned description, a case where the parameter updating unit 109 updates a numerical value of the threshold value θ according to a difference between lengths of voice sections has been described. Alternatively, the parameter updating unit 109 may segments magnitude relation between lengths of voice sections or of non-voice sections, and update the threshold value θ by a numerical value set in advance according to the magnitude relation.

For example, in a case where the length L2 of the second voice section>the length L1 of the first voice section, the parameter updating unit 109 may perform correction such that $\theta \leftarrow +\theta+\epsilon$, and in a case where the length L2 of the second voice section<the length L1 of the first voice section, it may perform correction such that $\theta \leftarrow \theta-\epsilon$.

For each utterance or each time one voice section is segmented, for example, the parameter updating unit 109 updates the threshold value θ. However, timing when the parameter updating unit 109 updates the threshold value θ is not limited to the above timing. For example, the parameter updating unit 109 may update the threshold value θ in response to an instruction of a speaker. Then the parameter updating unit 109 repeats the processing of steps S101-S106 for the next utterance or for the next voice section using the updated threshold value θ.

Meanwhile, the parameter updating unit 109 may perform processing of Steps S102-S106 for identical utterance using the updated threshold value θ. Also, the parameter updating unit 109 may repeat processing of S102-Step S106 for identical utterance not only once but a plurality of times.

Next, an effect in this exemplary embodiment will be described. As above, in the voice recognition apparatus in this exemplary embodiment, the voice segmentation unit 103 calculates the feature value indicating possibility of being voice based on the time-series input sound data. Further, the voice segmentation unit 103 compares the threshold value θ and the feature value which indicates possibility of being voice, and segments a section of voice (or a section of non-voice) to determine the first voice section. Also, the searching unit 108 determines the second voice section based on the likelihood of voice and the likelihood of non-voice that are calculated based on the feature value used for voice recognition. Then the parameter updating unit 109 updates the threshold value θ according to a difference between the length of the first voice section and the length of the second voice section. The voice segmentation unit 103 determines the first voice section using the updated threshold value θ. By such structure, the voice recognition apparatus can suppress bad influence of sounds other than a recognition object and estimate an utterance section to be a target correctly. Additionally, the offset calculating unit 104 calculates an offset of the likelihood from the feature value which indicates possibility of being voice and the threshold value θ. Then, the searching unit 108 identifies voices based on the likelihood corrected by the offset. Therefore, the searching unit 108 recognizes the voices to be the recognition object correctly, and it becomes easy to discriminate the others as the non-voices. In this way, voice recognition that is robust against noise is realized.

Moreover, the parameter updating unit 109 compares the first voice section and the second voice section, and updates the threshold value used by the voice segmentation unit 103 based on the comparison result. Therefore, even in a case where the threshold value is not set properly to a noise environment and a case where the noise environment fluctuate according to time, voice recognition that is more robust against noise can be realized because an offset of the likelihood can be obtained correctly.

Generally, the searching unit 108 can discriminate the voice section correctly in comparison with the voice segmentation unit 103. This is because the searching unit 108 segments the voice section using more information such as a vocabulary/phoneme model and a non-voice model. In contrast, because the voice segmentation unit 103 segments the voice section using the threshold values among which optimum values are different according to a situation of noise, there is a high possibility that an error is mixed. Because, in the voice recognition apparatus in this exemplary embodiment, in order to make the first voice section which the voice segmentation unit 103 has segmented more correct, the parameter updating unit 109 updates the threshold value using the second voice section segmented by the searching unit 108. Therefore, the voice segmentation unit 103 can perform more highly accurate search to the next utterance. From the above, the object of the present invention can be achieved.

Exemplary Embodiment 2

Figure 6:
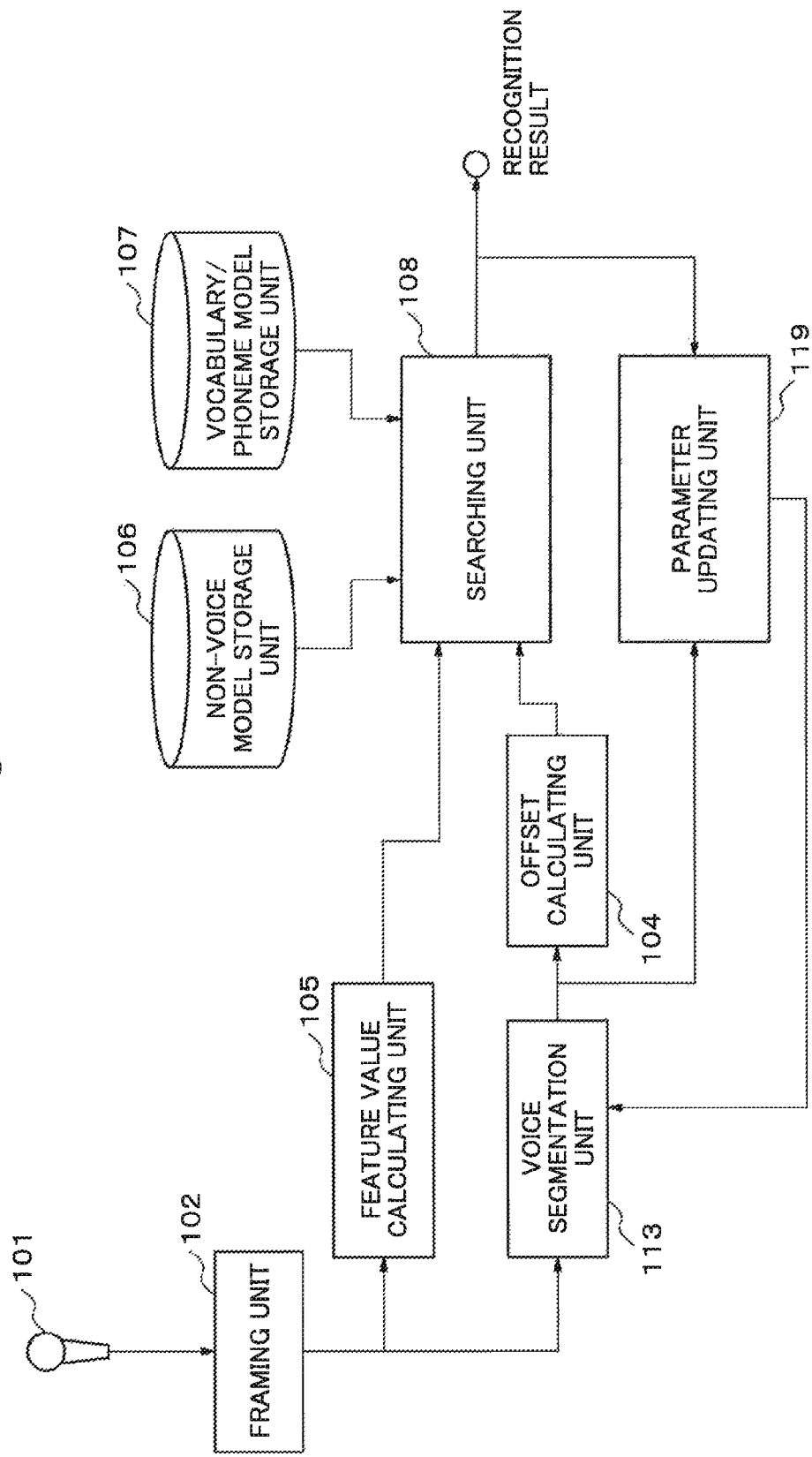
FIG. 6 is a block diagram showing an example of a voice recognition system in a second exemplary embodiment of the present invention.

Next, the second exemplary embodiment according to the present invention will be described. FIG. 6 is a block diagram showing an example of the voice recognition system in the second exemplary embodiment of the present invention. Meanwhile, codes identical with those of FIG. 1 are attached to the same structures as those of the first exemplary embodiment, and description will be omitted. The voice recognition system in the present invention includes the microphone 101, the framing unit 102, a voice segmentation unit 113, the offset calculating unit 104, the feature value calculating unit 105, the non-voice model storage unit 106, the vocabulary/phoneme model storage unit 107, the searching unit 108 and a parameter updating unit 119. That is, the voice recognition system in the second exemplary embodiment includes the voice segmentation unit 113 instead of the voice segmentation unit 103 of the structure of the voice recognition system in the first exemplary embodiment, and includes the parameter updating unit 119 instead of the parameter updating unit 109, respectively, as illustrated in FIG. 6.

The voice segmentation unit 113 calculates a feature value which indicates possibility of being voice (that is, a voice feature value) based on the time-series input sound data. Then, the voice segmentation unit 113 compares the threshold value θ for classifying an input sound into a voice or a non-voice and the voice feature value, and determines a section made by adding a margin (hereinafter, referred to as margin m) before and after a section of voice or a section of non-voice determined based on the threshold value θ as the first voice section. Specifically, the voice segmentation unit 113 determines a section made by adding the margin m before and after a section during which the feature value indicating possibility of being voice is larger than the threshold value θ as the first voice section. Thus, the voice segmentation unit 113 segments a section made by adding the margin to a section of voice during which the feature value indicating possibility of being voice is larger than the threshold value θ as the first voice section. A numerical value of the threshold value θ may be a fixed value set in advance, or may be a numerical value updated as needed as shown in the first exemplary embodiment. In the following description, as a numerical value of the threshold value θ, it is supposed that a fixed value set in advance is used.

The parameter updating unit 119 updates the margin m according to a difference between the length of the first voice section and the length of the second voice section. That is, the parameter updating unit 119 compares the first voice section and the second voice section, and updates length of the margin m used by the voice segmentation unit 113. At that time, the voice segmentation unit 113 determines the first voice section using the updated margin m. Thus, the voice segmentation unit 113 determines the first voice section using a numerical value (parameter) which the parameter updating unit 119 updates. Margin m updated by the parameter updating unit 119 is a parameter to be used when the voice segmentation unit 113 determines the first voice section.

The other structures (the microphone 101, the framing unit 102, the offset calculating unit 104, the feature value calculating unit 105, the non-voice model storage unit 106, the vocabulary/phoneme model storage unit 107 and the searching unit 108) are the same as those of the first exemplary embodiment.

The framing unit 102, the voice segmentation unit 113, the offset calculating unit 104, the feature value calculating unit 105, the searching unit 108 and the parameter updating unit 119 are realized by a CPU of a computer which operates according to a program (a voice recognition program). Also, each of the framing unit 102, the voice segmentation unit 113, the offset calculating unit 104, the feature value calculating unit 105, the searching unit 108 and the parameter updating unit 119 may be realized by dedicated hardware.

Next, operations of this exemplary embodiment will be described using FIG. 6 and FIG. 2. Operations in this exemplary embodiment are different from the operations of the first exemplary embodiment in a point that Step S102 and Step S106 in FIG. 2 are modified.

The framing unit 102 performs clipping of an input sound garnered by the microphone 101 for each frame (Step S101).

Next, the voice segmentation unit 113 calculates the feature value (that is, the voice feature value) which indicates possibility of being voice of input sound data clipped out for each frame. A method to calculate the feature value which indicates possibility of being voice is the same as that of the first exemplary embodiment. Next, the voice segmentation unit 113 compares the feature value which indicates possibility of being voice and the threshold value θ, and obtains a temporary voice section. A method to obtain the temporary voice section is similar to the method to obtain the first voice section in the first exemplary embodiment. For example, the voice segmentation unit 113 makes a section during which the feature value which indicates possibility of being voice is larger than the threshold value θ as the temporary voice section. Then, the voice segmentation unit 113 segments a section made by giving the margin m before and after the temporary voice section as the first voice section (Step S102).

Figure 7:
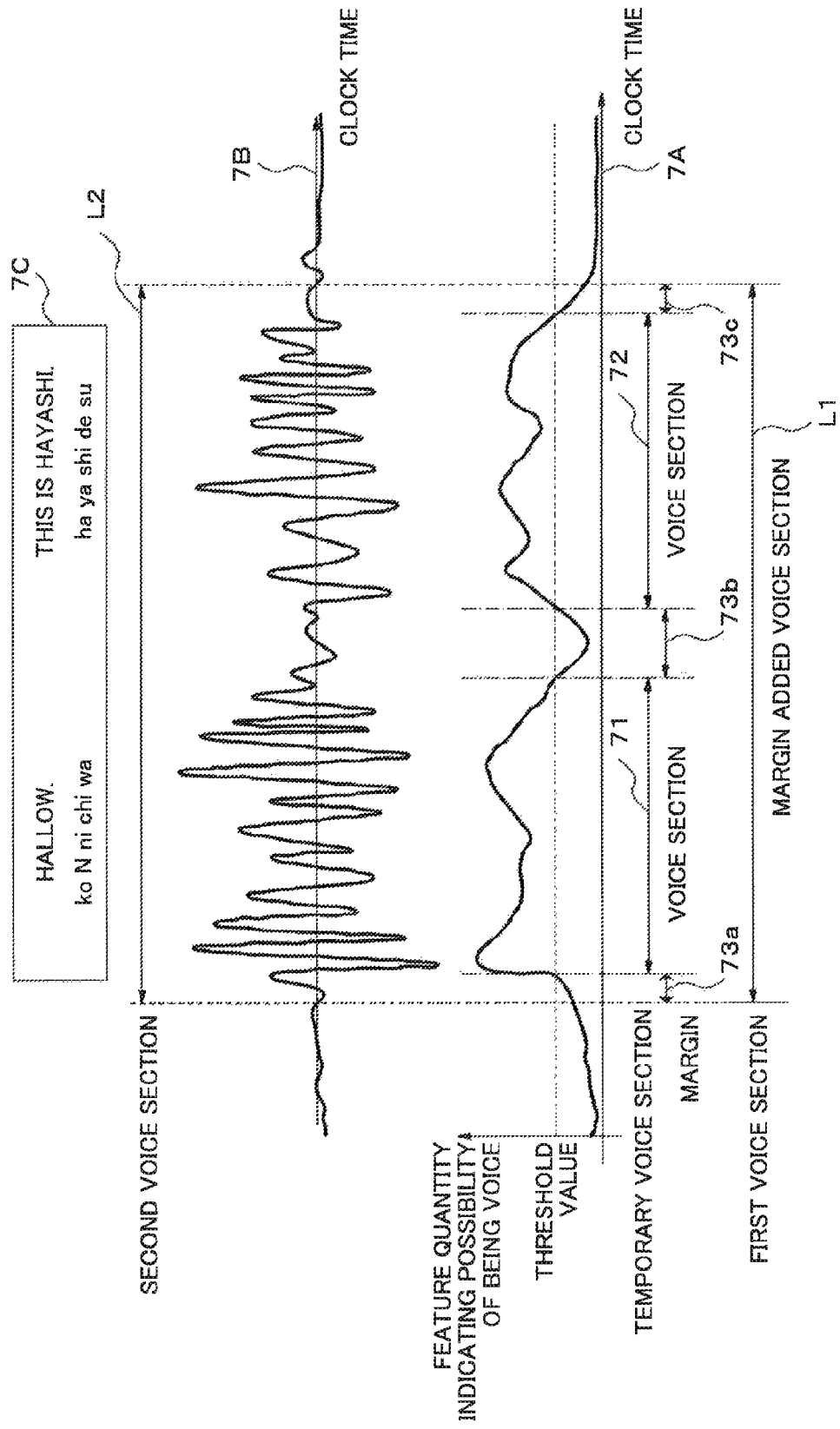
FIG. 7 is an explanatory drawing showing an example in which a margin is given to a temporary voice section.

FIG. 7 is an explanatory drawing showing an example in which the margin is given to the temporary voice section. In the example shown in FIG. 7, first, the voice segmentation unit 113 compares the feature value indicated by time series 7A with the threshold value θ, and makes a part where the feature value is larger than the threshold value θ as a voice section 71 and a voice section 72 that are temporal. Here, the voice segmentation unit 113 segments a section made by adding, as the margin, a margin 73a, a margin 73b and a margin 73c before and after the temporary voice sections as the first voice section.

Henceforth, processing in which the offset calculating unit 104 calculates the offset of the likelihood, and the feature value calculating unit 105 calculates the feature value used for voice recognition, and processing in which the searching unit 108 searches for the word sequence and segments the second voice section is similar to the processing of Steps S103-S105 in the first exemplary embodiment.

Next, the parameter updating unit 119 compares the first voice section which the voice segmentation unit 113 has determined and the second voice section which the searching unit 108 has determined, and updates a numerical value of the margin m which is a parameter used by the voice segmentation unit 113 (Step S106). Here, according to the length of the first voice section and the length of the second voice section, the parameter updating unit 119 updates a numerical value of the margin m to be given to a temporary voice section.

Hereinafter, using FIG. 4 and FIG. 5, operations by which the parameter updating unit 119 updates a numerical value of the margin m will be described. As illustrated in FIG. 4, when the length L1 of the first voice section is longer than the length L2 of the second voice section, the parameter updating unit 119 updates the margin m so that it may become shorter. On the contrary, when the length L1 of the first voice section is shorter than the length L2 of the second voice section as illustrated in FIG. 5, the parameter updating unit 119 updates the margin m so that it may become longer. Specifically, the parameter updating unit 119 updates the margin m using Formula 8 illustrated below.

$$m \leftarrow m + \epsilon(L1-L2) \qquad \text{(Formula 8)}$$

Here, $\epsilon$ is a positive numerical value which indicates a step size, and is a parameter for adjusting an amount by which the length of the margin m is changed by one time of update.

In the above-mentioned description, a case where the parameter updating unit 119 updates the margin m based on the lengths of voice sections has been described. Alternatively, the parameter updating unit 119 may update the margin m based on the lengths of non-voice sections. In this case, the voice segmentation unit 113 should just discriminate a first voice section made by giving the margin m to the temporary voice section which is a section of voice during which the threshold value $\theta$ is not exceeded, and the searching unit 108 should just discriminate a section during which the corrected likelihood Ln about non-voice is higher than the corrected likelihood Ls about voice as the second voice section.

The parameter updating unit 119 may updates not only the length of the margin m but also the value of the threshold value $\theta$ in the first exemplary embodiment together. Specifically, when the length of the first voice section is longer than the length of the second voice section, the parameter updating unit 119 updates the length of the margin m in a manner to make it shorter and updates the value of the threshold value $\theta$ in a manner to make it increased. When the length of the first voice section is shorter than the length of the second voice section, the parameter updating unit 119 updates the length of the margin m in a manner to make it longer and updates the numerical value of the threshold value $\theta$ in a manner to make it decreased. Meanwhile, a method to update the threshold value is similar to a method described in the first exemplary embodiment.

Also, in the above-mentioned description, a case where the parameter updating unit 119 updates the margin m according to a difference in lengths of voice sections has been described. Alternatively, the parameter updating unit 119 may segments magnitude relation between the lengths of voice sections or non-voice sections, and update the margin m by a numerical value set in advance according to the magnitude relation.

For example, the parameter updating unit 119 may perform correction such that $m \leftarrow m+\epsilon$ when length L2 of the second voice section>length L1 of the first voice section, and perform correction such that $m \leftarrow m-\epsilon$ when the length L2 of the second voice section<the length L1 of the first voice section.

The parameter updating unit 119 updates the margin m taking timing of each utterance or completion of discrimination of one voice section as a trigger, for example. However, timing when the parameter updating unit 119 updates the margin m is not limited to the above timing. For example, the parameter updating unit 119 may update the margin m according to an instruction of a speaker. Then the parameter updating unit 119 repeats processing of steps S101-S106 for the next utterance and the next voice section using the updated margin m.

Meanwhile, the parameter updating unit 119 may perform processing of Steps S102 to S106 for identical utterance using the updated margin m. The parameter updating unit 119 may repeat processing of S102-Step S106 for identical utterance not only once but a plurality of times.

Next, an effect in this exemplary embodiment will be described. As above, in the voice recognition apparatus in this exemplary embodiment, the voice segmentation unit 113 determines a section made by adding the margin m before and after a section during which the voice feature value is larger than the threshold value $\theta$ as the first voice section. The parameter updating unit 119 updates the length of the margin m to be added before and after a section. Then, the voice segmentation unit 113 determines a section made by adding the updated margin m before and after a section as the first voice section. Also by a structure like the above, the voice recognition apparatus can suppress negative influence of sounds other than the recognition object and estimate the utterance section to be the target correctly.

Because power of a consonant is generally smaller than that of a vowel, and it is easy to be confused with noise, there is a tendency that the front and rear of a voice section is lacked. Thus, by making a voice section which tends to lack its front and rear be a temporary voice section, and giving the margin m to this temporary voice section, the voice recognition apparatus can prevent lacking of voice.

Meanwhile, when the length of the margin m is set too long, there is a risk that sounds other than an object of voice recognition may be recognized as voice. Therefore, it is desired that the length of the margin m is set appropriately according to a background noise. Because, in the voice recognition apparatus in this exemplary embodiment, the parameter updating unit 119 updates the length of the margin m appropriately based on the length of the first voice section and the length of the second voice section, voice recognition that is robust against noise can be realized, and thus the object of the present invention can be achieved.

[The Minimum Configuration]

Figure 8:
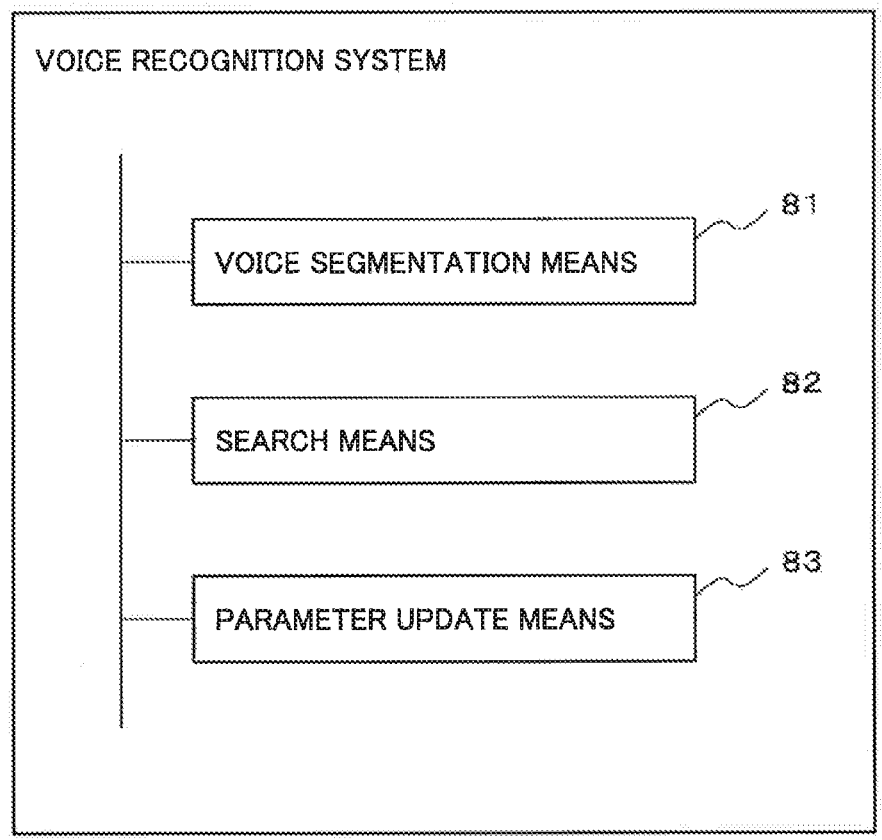
FIG. 8 is a block diagram showing an example of the minimum configuration of a voice recognition system according to the present invention.
Figure 9:
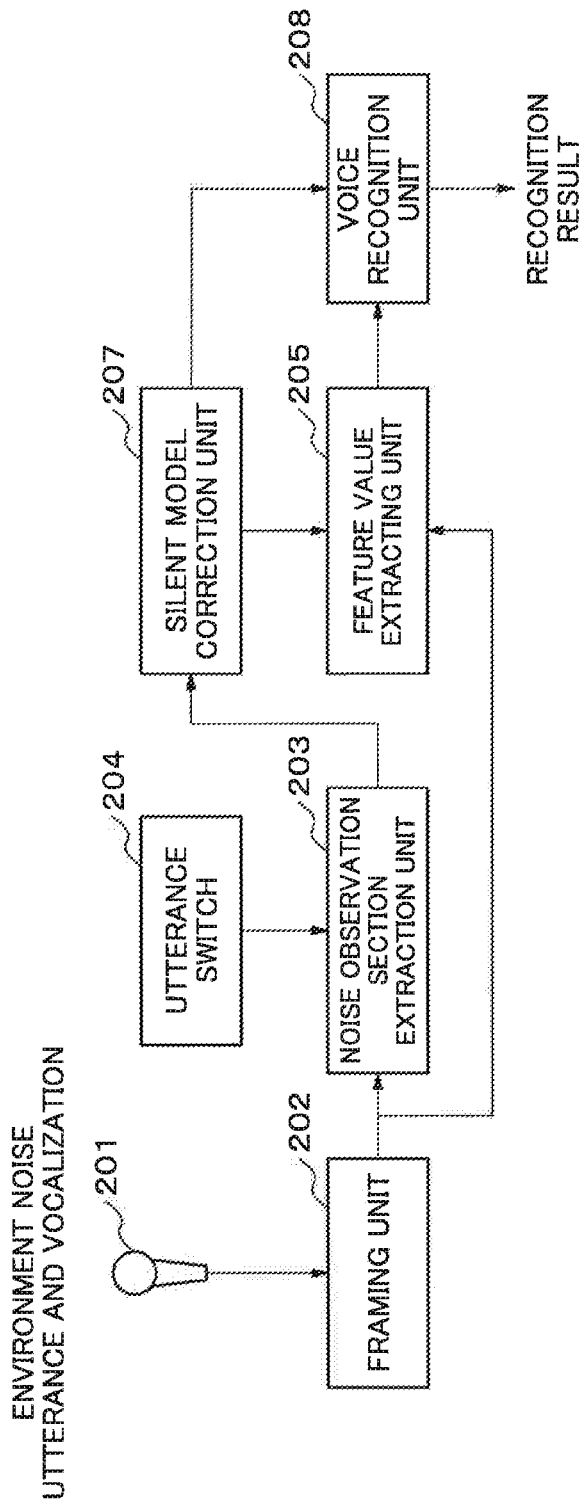
FIG. 9 is a block diagram showing a voice recognition apparatus disclosed in patent document 1.
Figure 10:
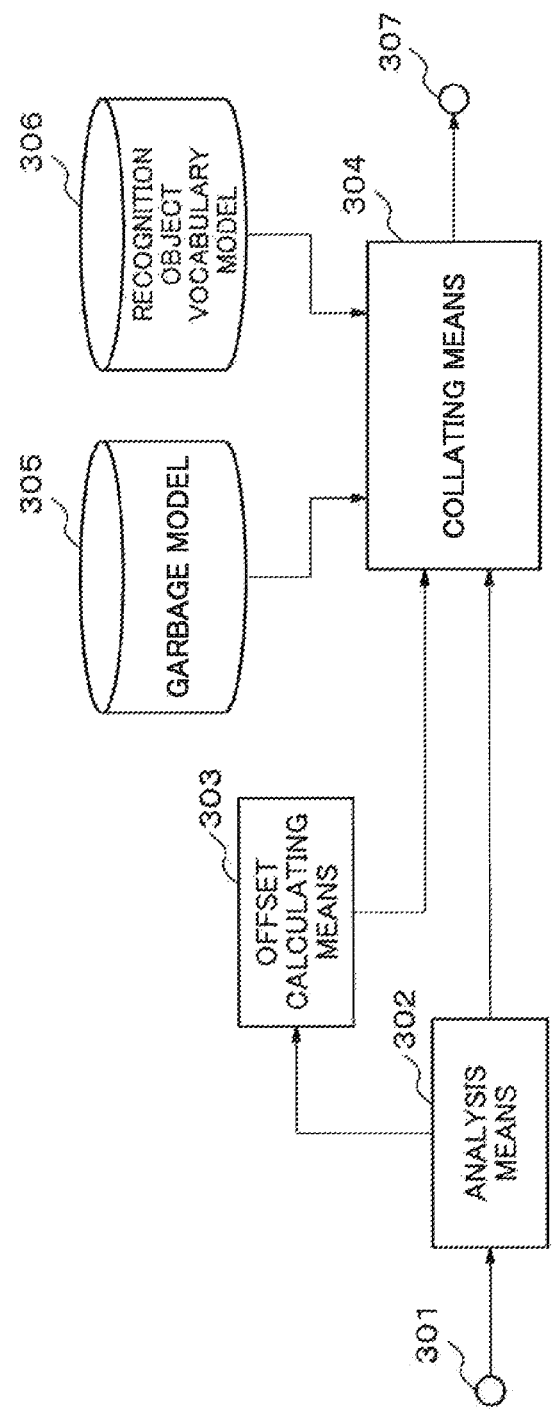
FIG. 10 is a block diagram showing a voice recognition apparatus disclosed in patent document 2.

Next, an example of the minimum configuration of the voice recognition system according to the present invention will be described. FIG. 8 is a block diagram showing the example of the minimum configuration of the voice recognition system according to the present invention. The voice recognition system according to the present invention includes: a voice discrimination means 81 (the voice segmentation unit 103, for example) for calculating a voice feature value which is a feature value indicating possibility of being a voice (amplitude power, for example) based on a time-series input sound data (input sound data clipped out for each frame, for example), segmenting, by comparing the threshold value set as a numerical value for classifying an input sound into a voice and a non-voice (the threshold value $\theta$, for example) and the voice feature value, a section of voice (a section during which the voice feature value is larger than the threshold value $\theta$, for example) or a section of non-voice (a section during which the voice feature value is smaller than the threshold value $\theta$, for example), and determining those sections or sections made by adding the margin (the margin m, for example) of designated length before and after those original sections as the first voice section; a search means 82 (the searching unit 108, for example) for determining, based on the likelihood of voice and the likelihood of non-voice calculated based on a voice recognition feature value which is the feature value used for voice recognition (calculated using Formula 4, for example), the section to be the target of the voice recognition (a section where the likelihood of voice is higher than the likelihood of non-voice, for example) as the second voice section; and a parameter update means 83 (the parameter updating unit 109 and the parameter updating unit 119, for example) for updating, according to a difference between the length of the first voice section and the length of the second voice section, at least one of the threshold value and the margin used when the voice discrimination means 81 determines the first voice section.

The voice discrimination means 81 determines the first voice section using the threshold value or the margin which has been updated by the parameter update means 83.

The voice recognition apparatus which is of the aforementioned constitution can suppress negative influence of sounds other than the recognition object, and estimate the utterance section to be the target correctly.

Meanwhile, at least voice recognition systems as shown in the bellow are also disclosed in any of the exemplary embodiments indicated above.

(1) The voice recognition system including: a voice discrimination means (the voice segmentation unit 103, for example) for calculating the voice feature value which is the feature value indicating possibility of being voice (amplitude power, for example) based on the time-series input sound data (input sound data clipped out for each frame, for example), segmenting, by comparing the threshold value set as a numerical value for classifying the input sound into a voice and a non-voice (the threshold value θ, for example) and the voice feature value, the section of voice (a section during which the voice feature value is larger than the threshold value θ, for example) or the section of non-voice (a section during which the voice feature value is smaller than the threshold value θ, for example), and determining those sections or sections made by adding the margin (the margin m, for example) of the designated length before and after those original sections as the first voice section; a search means (the searching unit 108, for example) for determining, based on the likelihood of voice and the likelihood of non-voice calculated based on the voice recognition feature value which is the feature value used for voice recognition (for example, one calculated using Formula 4), the section to be the target of the voice recognition (a section where the likelihood of voice is higher than the likelihood of non-voice, for example) as the second voice section; a parameter update means (the parameter updating unit 109 and the parameter updating unit 119, for example) for updating, according to a difference between the length of the first voice section and the length of the second voice section, at least one of the threshold value and the margin used when the voice discrimination means determines the first voice section; and the voice discrimination means determining the first voice section using the threshold value or the margin which have been updated by the parameter update means.

(2) The voice recognition system, wherein the parameter updating means increases the threshold value when the length of the first voice section is longer than the length of the second voice section, and decreases the threshold value when the length of the first voice section is shorter than the length of the second voice section.

(3) The voice recognition system, wherein the parameter updating means shorten the length of the margin when the length of the first voice section is longer than the length of the second voice section, and lengthen the length of the margin when the length of the first voice section is shorter than the length of the second voice section.

(4) The voice recognition system, including: vocabulary phoneme model storage means (the vocabulary/phoneme model storage unit 107, for example) for storing the vocabulary and phoneme model representing the pattern of one of vocabulary and the phoneme of voice to be the target of the voice recognition; non-voice model storage means (the non-voice model storage unit 106, for example) for storing the non-voice model representing the pattern of non-voice to be the target of the voice recognition, wherein the search means calculates, based on the voice recognition feature value, the likelihood of the vocabulary phoneme model which is the likelihood of voice and the likelihood of the non-voice model which is the likelihood of non-voice, searches for, when the maximum value of the likelihood of voice is larger than a maximum value of the likelihood of non-voice, the pattern of one of vocabulary and the phoneme of voice by which the likelihood of voice becomes biggest, and searches for, when the maximum value of the likelihood of non-voice is larger than the maximum value of the likelihood of voice, the pattern of non-voice by which the likelihood of non-voice becomes biggest.

(5) The voice recognition system, comprising: offset calculating means (the searching unit 108, for example) for calculating, according to a difference between the voice feature value and the threshold value, the offset used as a value to correct at least one likelihood of the likelihood of the vocabulary phoneme model and the likelihood of the non-voice model; and the search means segmenting the second voice section based on the likelihood corrected based on the offset.

(6) The voice recognition system, wherein the offset calculating means calculates a value made by subtracting the threshold value from the voice feature value as the offset of the likelihood of the vocabulary phoneme model (for example, the offset is calculated using Formula 2), and calculates a value made by subtracting the voice feature value from the threshold value as the offset of the likelihood of the non-voice model (for example, the offset is calculated using Formula 3).

(7) The voice segmenting means, wherein the voice segmenting means calculates, based on the time-series input sound data, one of amplitude power, the signal-to-noise ratio, the number of zero crossings, one of the likelihood ratio on the Gaussian mixture distribution model and the pitch frequency based, or combinations of these as the voice feature value.

(8) A voice recognition system according to the present invention includes voice segmentation means for calculating voice segmentation feature values for sequential units of input sound, classifying voice units and non-voice units by comparing a threshold value and said voice segmentation feature values, merging connected voice units into one of voice section, value and determining one of said voice section and a section made by adding a margin of designated length before and after said original voice section as a first voice section; search means for determining a section to be a target of voice recognition as a second voice section based on likelihoods of voice and likelihoods of non-voice calculated based on voice recognition feature values; and parameter updating means for updating at least one of said threshold value and said margin used upon said voice segmentation means determining the first voice section according to a difference between length of said first voice section and length of said second voice section.

(9) A voice recognition method according to the present invention calculates voice feature values for sequential units of input sound; classifies voice units and non-voice units by comparing a threshold value and said voice segmentation feature values, merges connected voice units into one of voice section, determines one of said voice section and a section made by adding a margin of designated length before and after said original voice section as a first voice section; determines a section to be a target of a voice recognition as a second voice section based on likelihoods of voice and likelihoods of non-voice calculated based on voice recognition feature values; and, updates at least one of said threshold value and said margin used upon determining said first voice section according to a difference between length of said first voice section and length of said second voice section.

(10) A voice recognition program stored in a program recording medium according to the present invention causes a computer to execute voice segmentation processing for calculating voice feature values for sequential units of input sound, classifying voice units and non-voice units by comparing a threshold value and said voice segmentation feature values, merging connected voice units into one of voice section, and determining one of said voice section and a section made by adding a margin of designated length before and after said voice section as a first voice section; search processing for determining a section to be a target of a voice recognition as a second voice section based on likelihoods of voice and likelihoods of non-voice calculated based on voice recognition feature values; and, parameter updating processing for updating at least one of said threshold value and said margin used upon determining said first voice section according to a difference between length of said first voice section and length of said second voice section.

Although the present invention has been described with reference to the exemplary embodiments above, the present invention is not limited to the above-mentioned exemplary embodiments. Various modifications which a person skilled in the art can understand can be made in the composition and details of the present invention within the scope of the present invention.

This application claims priority based on Japanese application Japanese Patent Application No. 2009-280927 filed on Dec. 10, 2009, the disclosure of which is incorporated herein in its entirety.

DESCRIPTION OF THE REFERENCE NUMERALS

101 Microphone
102 Framing unit
103,113 Voice segmentation unit
104 Feature value calculating unit
105 Feature value calculating unit
106 Non-voice model storage unit
107 Vocabulary/phoneme model storage unit
108 Searching unit
109, 119 Parameter updating unit

The invention claimed is:

1. A voice recognition system, comprising:
  voice segmentation unit which calculates a voice feature value based on time-series input sound data, segmenting one of a section of voice of said time-series input sound data and a section of non-voice of said time-series input sound data by comparing a threshold value and said voice feature value, and determining one of said section and a section made by adding a margin of designated length before and after said original section as a first voice section;
  search unit which determines a section to be a target of a voice recognition as a second voice section based on a likelihood of voice and a likelihood of non-voice calculated based on a voice recognition feature value;
  parameter updating unit which updates at least one of said threshold value and said margin used upon said voice segmentation unit determining the first voice section according to a difference between length of said first voice section and length of said corresponding second voice section; and
  said voice segmentation unit which determines the first voice section using one of the threshold value and the margin updated by said parameter updating unit.

2. The voice recognition system according to claim 1, wherein
  said parameter updating unit increases said threshold value when the length of said first voice section is longer than the length of said second voice section, and decreases said threshold value when the length of said first voice section is shorter than the length of said second voice section.

3. The voice recognition system according to claim 1, wherein
  said parameter updating unit shortens length of said margin when the length of said first voice section is longer than the length of said second voice section, and lengthen length of said margin when the length of said first voice section is shorter than the length of said second voice section.

4. The voice recognition system according to any one of claim 1, further comprising:
  vocabulary phoneme model storage unit which stores a vocabulary and phoneme model representing a pattern of one of vocabulary and a phoneme of voice to be the target of voice recognition;
  non-voice model storage unit which stores a non-voice model representing a pattern of non-voice to be a target of voice recognition, wherein
  said search unit calculates, based on said voice recognition feature value, a likelihood of said vocabulary phoneme model which is the likelihood of voice and a likelihood of said non-voice model which is the likelihood of non-voice, searches for, when a maximum value of said likelihood of voice is larger than a maximum value of said likelihood of non-voice, a pattern of one of vocabulary and a phoneme of voice by which said likelihood of voice becomes biggest, and searches for, when the maximum value of said likelihood of non-voice is larger than the maximum value of the likelihood of voice, a pattern of non-voice by which said likelihood of non-voice becomes biggest.

5. The voice recognition system according to claim 4, comprising:
  offset calculating unit which calculates, according to a difference between said voice feature value and said threshold value, an offset of at least one likelihood of the likelihood of said vocabulary phoneme model and the likelihood of said non-voice model; and
  said search unit segmenting said second voice section based on likelihood corrected based on said offset.

6. The voice recognition system according to claim 5, wherein
  said offset calculating unit calculates a value made by subtracting said threshold value from said voice feature value as said offset of the likelihood of said vocabulary phoneme model, and calculates a value made by subtracting said voice feature value from said threshold value as said offset of a likelihood of said non-voice model.

7. The voice recognition system according to claim 1, wherein said voice segmentation unit calculates, based on said time-series input sound data, one of amplitude power, a signal-to-noise ratio, a number of zero crossings, one of a likelihood ratio and a pitch frequency based on a gauss mixture distribution model, and combinations of these as the voice feature value.

8. A voice recognition method:

calculates a voice feature value based on time-series input sound data;

segments one of a section of voice of said time-series input sound data and a section of non-voice of said time-series input sound data by comparing a threshold value and said voice feature value; determines one of said section and a section made by adding a margin of designated length before and after said original section as a first voice section;

determines a section to be a target of a voice recognition as a second voice section based on a likelihood of voice and a likelihood of non-voice calculated based on a voice recognition feature value;

updates at least one of said threshold value and said margin used upon determining said first voice section according to a difference between length of said first voice section and length of said corresponding second voice section; and, upon segmenting said first voice section, determines a first voice section using one of the updated threshold value and the margin.

9. A non-transitory computer-readable program recording medium for storing a voice recognition program causing a computer to execute:

voice segmenting processing for calculating a voice feature value based on time-series input sound data, segmenting one of a section of voice of said time-series input sound data and a section of non-voice of said time-series input sound data by comparing a threshold value and said voice feature value, and determining one of said section and a section made by adding a margin of designated length before and after said section as a first voice section;

search processing for determining a section to be a target of a voice recognition as a second voice section based on a likelihood of voice and a likelihood of non-voice calculated based on a voice recognition feature value;

parameter updating processing for updating at least one of said threshold value and said margin used upon determining said first voice section according to a difference between length of said first voice section and length of said corresponding second voice section; and, in said voice segmenting processing, making the first voice section be determined using one of the threshold value and the margin updated in said parameter updating processing.

* * * * *